April 7, 1964     R. J. FRANZ ETAL     3,128,368
APPARATUS FOR WELDING

Filed July 31, 1961     2 Sheets-Sheet 1

INVENTORS
RAYMOND J. FRANZ
CLARENCE VERBEEK
AMEL R. MEYER
BY Byron, Hume, Groen & Clement
ATTORNEYS.

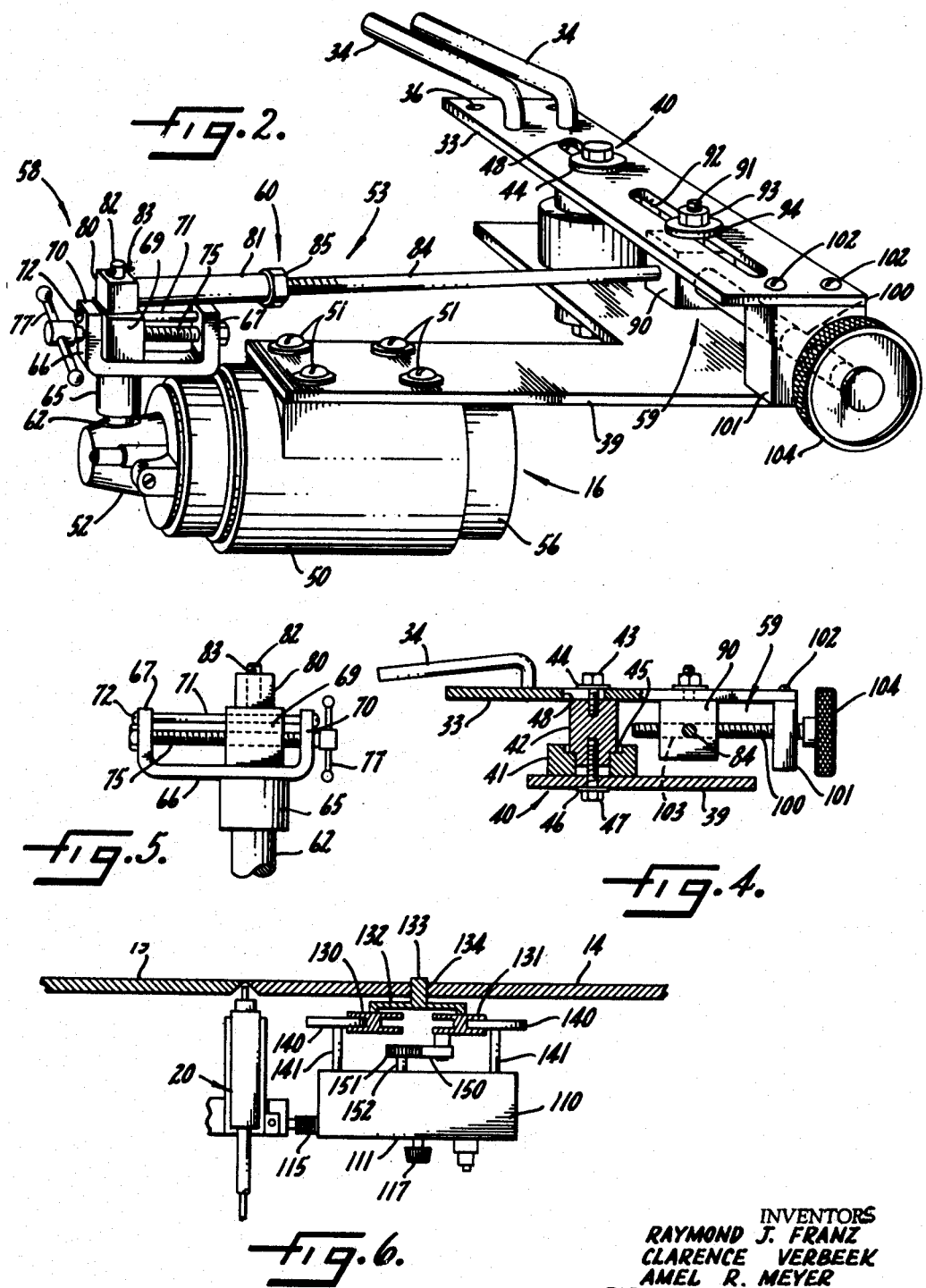

United States Patent Office 3,128,368
Patented Apr. 7, 1964

3,128,368
APPARATUS FOR WELDING
Raymond J. Franz, Crown Point, Ind., Clarence Verbeek, Lansing, Ill., and Amel R. Meyer, Griffith, Ind., assignors to Union Tank Car Company, Chicago, Ill., a corporation of New Jersey
Filed July 31, 1961, Ser. No. 128,097
7 Claims. (Cl. 219—125)

The present invention relates in general to the welding art and, more particularly, relates to an apparatus for welding adjacent members.

It is an object of this invention to provide a new and improved welding apparatus.

It is another object to provide a new and improved apparatus for arc welding aluminum members.

It is another object to provide an improved arc welding apparatus for welding vertical seams or joints.

It is still another object to provide an automatic welding apparatus for welding together aluminum members with better welds than obtainable from presently available equipment.

It is a further object to provide welding apparatus of the aforedescribed character which eliminates porosity and lack of fusion in a finished weld.

It is another object to provide an arc welding apparatus which assures constant heat input to the welding area.

It is yet a further object to provide an arc welding apparatus which sweeps the joint area ahead of the welding electrode with inert gas and avoids violent penetration of the weld joint by the arc.

It is another object to provide an arc welding apparatus which avoids welding arc deposition in a scatter pattern and eliminates the excessive spatter of molten metal.

It is a further object to provide a welding apparatus including an electric arc which automatically contacts each portion of a fast freezing aluminum weld deposit at least twice to allow the escape of imprisoned gases.

It is yet another object to provide a welding apparatus which assures the deposition of a predetermined proper amount of molten metal in the weld joint.

It is another object to provide a welding apparatus that assures a weld bead of pleasing appearance and uniform size.

It is still another object to provide a welding apparatus wherein beneficial overlapping of the weld bead along the weld joint is assured.

It is yet another object to provide an arc welding apparatus which builds up less heat than comparable units and induces less warping and distortion in the members being welded.

Briefly, the invention contemplates an apparatus for welding adjoining members. In the apparatus, a welding torch is automatically moved along a seam between adjoining members to weld the members together. As the torch progresses along the seam, it is maintained in a predetermined attitude relative to the members and the seam while moving at a predetermined rate of travel. At the same time, the torch feeds a consumable welding electrode into proper relation with the seam at a predetermined rate corresponding to the rate of travel of the torch along the seam.

Simultaneously, the welding torch is oscillated transversely of the seam and, in this connection, the amplitude of oscillation of the welding torch can be both coarsely and finely adjusted. Throughout this welding operation, an inert gas sweeps ahead of the welding head "cleaning" the joint area in advance of the weld bead.

The invention, both as to its organization and method of operation, taken with further objects and advantages thereof will best be understood by reference to the following description taken in connection with the accompanying drawings, in which:

FIG. 2 is an enlarged perspective view of an oscillation control assembly embodied in the apparatus of FIG. 1;

FIG. 4 is a view taken along line 4—4 of FIG. 3;

FIG. 5 is a view taken along line 5—5 of FIG. 3, with parts broken away in the background; and FIG. 6 is a diagrammatic plan view illustrating the welding apparatus in welding position.

Figure 1:
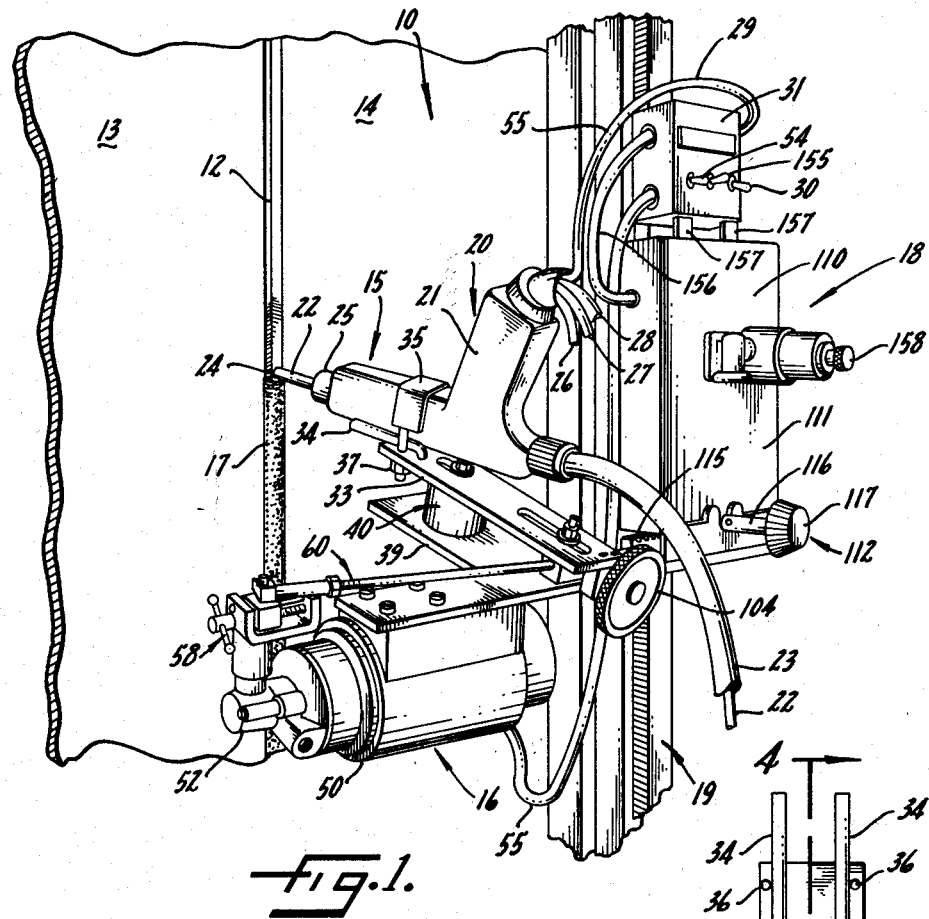
FIG. 1 is a perspective view of a welding apparatus embodying the features of this invention and illustrated in operative relationship with a seam defined by vertically disposed plate members.

Referring now to the drawings and particularly to FIG. 1, a welding apparatus embodying the features of this invention is illustrated generally at 10. The welding apparatus 10 is adapted to produce and reproduce a sound, substantially porosity free welding bead of pleasing appearance and uniform size along the extent of a seam 12 defined between an adjoining pair of vertically extending plates 13 and 14. The welding apparatus 10 is shown in operative relationship with the vertically disposed plates 13 and 14 which might, for example, form part of one ring segment in a segmental wall of a storage tank (not shown).

The plates 13 and 14 are made of aluminum and particularly adapted to be welded by the welding apparatus 10 embodying the features of this invention. As is well known in the field, aluminum welding is normally a painstaking and difficult operation. Because of its fast set-up or freezing properties, an aluminum weld deposit must be contacted by a hot welding arc at least twice. First, when the weld is deposited and second to remelt a portion of the weld and allow the escape of porosity forming gases that would ordinarily be trapped due to aluminum's fast freezing properties. Other characteristics of aluminum also force the adoption of special welding techniques which are often slow and relatively expensive.

The present invention makes it possible to consistently obtain porosity free welds in aluminum, something which has not been generally realized before. Heretofore, virtually the only method of obtaining porosity free welds has been by the manual inert-gas-shielded tungsten arc process (heliarc). However, it is a substantially slower process and because of its slow speed, heat input into the members being welded is considerably increased, frequently causing warping and distortion.

The welding apparatus 10 includes a welding torch 15 that feeds a consumable welding electrode directly into the seam 12, the torch 15 being mounted on an oscillation control assembly 16 adapted to continuously move the electrode in an oscillating fashion back and forth across the seam 12 as a weld bead 17 is built up. The oscillation control assembly 16 is adjustably carried by a carriage 18 in such a manner that the welding torch 15 extends at a predetermined angle relative to the plates 13 and 14. The carriage 18 is adapted to be driven up and down a track assembly 19 which, for example, is suitably attached to the storage tank (not shown) being welded, for example.

The actual welding is performed by the welding torch 15 which includes an inverted conventional arc welding gun 20 of the type which is ordinarily adapted to manual use. The gun 20 comprises a shell 21 made of insulated material, such as Bakelite, or the like. A consumable electrode 22 is fed into the shell 21 through an electrode conduit 23 from a motor driven reel (not shown) of any well known construction. The motor driven reel (not shown) feeds aluminum electrode 22, for example, through the welding gun 20 at a rate corresponding to the rate of travel of the torch 15, and consequently to the rate of travel of the free end 24 of the electrode 22, vertically along the seam 12. As will be seen, the free end 24 of the electrode emerges from the shell 21 through a contact tip or sleeve 25 which is preferably formed of copper and surrounds the electrode at the foremost extremity of the welding torch 15.

In a well known manner, an inert gas such as argon is supplied to the welding torch 15 through a supply conduit 26 from a conventional source (not shown) of inert gas. In a similar manner, cooling water is also supplied to the torch 15 through a supply conduit 27 from a conventional source of water. The cooling water leaves the torch 15 through a return conduit 28. The construction and arrangement of the argon gas supply and cooling water supply is substantially conventional and it is not thought necessary to describe it in detail. Briefly, however, the argon passes outwardly through the copper welding tip or sleeve 25 of the torch 15 so as to be in surrounding relationship with the electrode 22 and envelops the welding area as the torch 15 builds up a weld bead 17. At the same time the cooling water courses through conventional cooling conduits within the gun 20 to prevent unduly high temperatures from building up in the body of the torch.

The welding torch 15 is preferably supplied with operating current through a power source cable 29 from a conventional two-way switch 30 mounted in a control box 31 incorporated in the carriage 18. The power input to the control box 31 might be from any conventional source of current (not shown).

Referring now to FIGURE 2, the oscillation control assembly 16 is adapted to support the welding torch 15 at a predetermined angle relative to the seam 12 and the plates 13 and 14. The control assembly oscillates the welding torch 15 and consequently the electrode 22 across the seam 12 as the welding operation progresses. Coarse adjustment of the amplitude of the free end 24 of the electrode 22 can be readily accomplished prior to starting the welding operation, while fine adjustment to compensate for changes in seam width and other variations is readily made during the welding operation itself.

The oscillation control assembly 16 includes a mounting plate 33 upon which the welding torch 15 is seated, as seen best at FIG. 1. Referring now to FIG. 2, support fingers 34 extend forwardly of the mounting plate 33 and the welding torch 15 is seated in inverted relationship on the fingers 34. A conventional U-clamp 35 overlies the barrel of the gun 20, passes through aligned apertures 36 in the mounting plate, and is secured to the mounting plate on opposite sides of the barrel with conventional lock nuts 37.

As best seen in FIGS. 2 and 4, the mounting plate 33 is pivotally mounted on a base plate 39 for oscillation about a pivotal connection, identified generally as 40. The pivotal connection 40 includes a first bearing element 41 secured, as by welding for example, to the base plate 39 and a second bearing element 42 adjustably secured to the mounting plate 33 by a lock screw 43 and a washer 44. The bearing elements 41 and 42 engage each other on a bearing surface 45 and are held in this relationship by a washer 46 and a lock screw 47 extending up through the base plate 39 into engagement with the first bearing element 41. The adjustment of the mounting plate 33, along the length of the slot 48 through which the lock screw 43 extends, permits an initial adjustment of the setting of the mounting plate 33 relative to the vertically extending plates 13 and 14, as will readily be seen.

Figure 3:
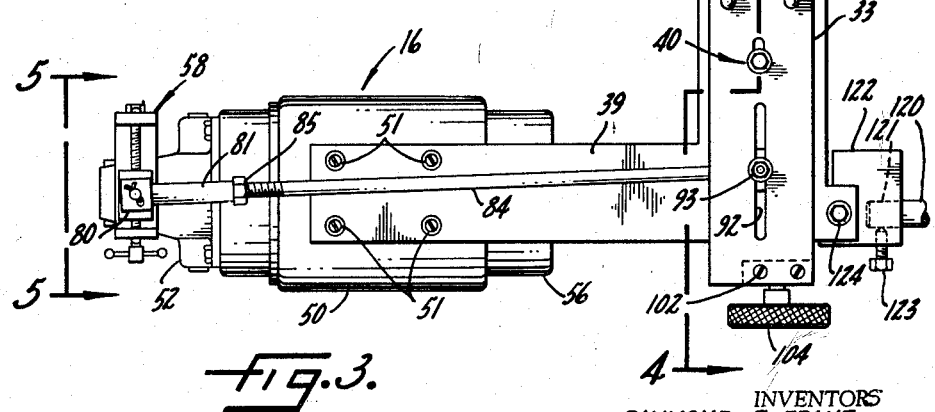
FIG. 3 is a plan view of the oscillation control assembly shown in FIG. 2.

The base plate 39, as seen in FIGS. 1 through 3, is generally L-shaped and, as has been pointed out, it pivotally supports the mounting plate 33 upon its upper surface in general alignment with one leg of the base plate 39. The motive force for oscillating the mounting plate 33 about its pivotal connection 40 is provided by a conventional electrical motor 50 secured to the other leg of the L-shaped base plate 39 on its lower surface by bolts 51 or by any other well known means such as welding, for example. Power is supplied to the motor 50 from the aforedescribed source of electrical current (now shown) through a conventional two-way switch 54 mounted in the aforedescribed control box 31. An electrical conduit 55 connects the motor 50 to the two-way switch 54 which provides merely an on and off control of the motor. The speed of the motor is varied through a conventional type speed control mechanism 56 rotatably mounted on one end of the motor 50 itself.

The motor 50 carries at its one end a speed reducer 52 which is drivingly connected to the mounting plate 33 through a drive assembly, seen generally at 53. The drive assembly 53 between the speed reducer 52 and the mounting plate 33 incorporates a coarse adjustment unit 58 which is adapted to vary the amplitude of oscillation of the mounting plate 33 and consequently the welding torch 15 prior to beginning a welding operation. The drive assembly 53 further incorporates a fine adjustment unit 59 for varying the amplitude of oscillation while the welding operation is in progress. An adjustable drive rod 60 interconnects the coarse adjustment unit 58 and the fine adjustment unit 59 and therein drivingly connects the motor 50 through the speed reducer 52 to the mounting plate 33.

The coarse adjustment unit 58 is mounted on the speed reducer 52 through a power take off shaft 62 extending generally perpendicular to the axis of the motor 50. The power take off shaft 62 might be connected in driving relationship (through the speed reducer 52) to the drive shaft (not shown) of the motor 50 through a conventional worm gear arrangement (not shown). The coarse adjustment unit 58 is adapted to transform the rotary output of the power take off shaft 62 into reciprocating movement in the drive rod 60. The amount of reciprocation of the drive rod 60 is initially determined by the setting of the coarse adjustment unit 58.

It will, of course, be seen that the shaft 62 rotates on a vertical axis at a speed determined by the speed of the motor 50 and the setting of the speed reducer 52. As has been pointed out, the speed of the motor 50 is ordinarily pre-set by manipulating the speed control mechanism 56 prior to beginning a welding operation.

The coarse adjustment unit 58 includes a fitting 65, secured to the vertically extending shaft 62. The fitting 65 carries a generally U-shaped bracket 66 secured to its upper extremity, also preferably by welding. The U-shaped bracket 66 is off-set in its connection to the fitting 65, as best seen in detail in FIGURE 5. Consequently, as the fitting rotates, it will be readily seen that the upstanding leg 67 of the bracket 66 defines a circle about the axis of the shaft 62.

The adjustable drive rod 60 is connected to the coarse adjustment unit 58 through a connector block 69 mouted for movement between the upstanding leg 67 of the U-shaped bracket 66 and its oppositely disposed upstanding leg 70. The connector block 69 is slidably mounted on a horizontally extending guide pin 71 which extends through appropriately disposed apertures in the legs 67 and 70 and is secured to these legs by any conventional means, such as metal screws 72. The connector block 69, and consequently the point of connection between the coarse adjustment unit 58 and the corresponding end of the adjustable drive rod 60, can be moved between the upstanding legs 67 and 70 of the U-shaped bracket 66 by an externally threaded rod 75 which is mounted for rotation in appropriately disposed apertures in the upstanding legs 67 and 70. The externally threaded rod 75 extends through an internally threaded bore 76 in the connector block 69 in threaded relationship.

The externally threaded rod 75 carries a cross member 77 which is adapted to rotate the rod and consequently cause the internally threaded connector block 69 to move slidably along the guide pin 71 between the upstanding legs 67 and 70 of the bracket 66. Adjusting the block 69 relative to the legs 67 and 70 obviously varies its position relative to the axis of rotation of the shaft 62, as has been pointed out.

Consequently, as best seen in FIGURE 2, the connector block 69 and, as a result, the corresponding end of the drive rod 60 defines an increasingly greater circle about the axis of the shaft 62 as the block 69 is moved toward the upstanding leg 67 of the bracket 66 and away from the oppositely disposed leg 70. This in turn results in an increased amount of reciprocation of the adjustable drive rod 60.

The connection between the adjustable drive rod 60 and the connector block 69 of the coarse adjustment unit 58 is effected through a mounting block 80 carried at one end of an internally threaded sleeve 81 forming a portion of the drive rod. The mounting block 80 is pivotally connected to the connector block 69 through a vertically extending pin 82. The pin 82 is rigidly connected, as by welding, to the connector block 69 and carries a cotter pin 83 adjacent its outer extremity to hold the mounting block 80 in pivotal relationship on the pin 82.

An externally threaded rod 84 is preferably threaded into the internally threaded sleeve 81 and a lock nut 85 is threaded onto the rod 84 and against the end of the sleeve 81 to fix the relationship between the sleeve and the rod. Hence, the length of the drive rod 60 is readily adjustable and, in this connection, is ordinarily adjusted to a desired length when the oscillation control assembly 16 is initially set up for a welding operation.

At the opposite end of the adjustable drive rod 60 and interconnecting the drive rod with the mounting plate 33 is the fine adjustment unit 59, as has hereinbefore been pointed out. The fine adjustment 59 includes a mounting block 90 which is operatively secured to the free end of the externally threaded rod 84 of the right end of the adjustable drive rod 60. The mounting block 90 carries a threaded pin 91 extending upwardly through a slot 92 in the mounting plate 33. The slot 92 extends generally longitudinally of the mounting plate 33 and is of substantial length. A nut 93 is threaded on the pin 91 over a washer 94 and maintains the mounting block 90, and consequently the corresponding end of the adjustable drive rod 60, in sliding and driving engagement with the mounting plate 33.

By varying the distance between the pin 91, which connects the drive rod 60 to the mounting plate 33, and the pivotal connection 40, which interconnects the mounting plate 33 and the base plate 39, it will be seen that the amplitude of oscillation of the free end 24 of the welding electrode 22 is varied. As best seen in FIG. 4, this variation is afforded by an adjusting screw 100 operatively mounted in a fitting 101 affixed to the end of the mounting plate 33 opposite that end which carries the support fingers 34 and consequently the welding torch 15. The fitting 101 is secured to the mounting plate 33 by conventional metal screws 102. The adjusting screw 100 extends through an internally threaded aperture 103 in the mounting block 90 forming the corresponding end of the adjustable drive rod 60. Consequently, turning the adjusting screw 100 through its control knob 104 causes the aforedescribed distance between the pin 91 and the pivotal connection 40 to vary accordingly.

In operation, movement of the pivot 91 toward the pivoted assembly 40 causes an increase in the amplitude of oscillation of the free end 24 of the welding electrode 22. On the contrary, the lengthening of this distance correspondingly decreases the amplitude of oscillation. These variations are of a relatively smaller nature, for corresponding variations in settings, than those effected by the coarse adjustment unit 58. Since the adjustment control knob 104 is readily accessible during welding operations, the adjustment of the amplitude of oscillation can readily be accomplished during these welding operations. It will now be seen that the coarse adjustment unit 58 permits a pre-operative adjustment of the amplitude of oscillation of the welding torch 15 or more effectively, the welding electrode tip 24. After the welding operation has begun, the fine adjustment necessary to compensate for widening or narrowing the seam 12 is readily made through the fine adjustment 59.

As has also been pointed out, the oscillation control assembly 16 is carried by the carriage 18 for movement with the carriage on the track assembly 19 established in predetermined relationship relative to the plates 13 and 14 and consequently the seam 12. As best seen in FIGURE 1, the carriage includes a housing 110 on which is mounted a conventional electric motor, seen generally at 111. The electric motor 111 is adapted to move the carriage 18 vertically upon the track assembly 19.

Also referring to FIGURE 1, a connection unit, seen generally at 112, facilitates lateral adjustment of the oscillation control assembly 16 and consequently the welding torch 15 relative to the carriage 18. Consequently, the welding electrode 22 can be pre-oriented in proper lateral relationship relative to the seam 12 after the track assembly 19 has been set up roughly in proper relationship to the plates to be welded. The connection unit 112 also facilitates angular adjustment of the oscillation control assembly 16 and consequently the welding torch 15 relative to the carriage 18, about a generally horizontal axis. In this manner, a predetermined angular relationship of the electrode 22 relative to the plates 13 and 14 and the seam 12 can be established prior to beginning the welding operation.

The connection unit 112 includes a conventional rack 115 and gear (not shown) arrangement incorporated in the lower portion of the housing 110. The gear referred to is mounted within the housing on the end of an adjusting pin 116 which extends outwardly of the front of the housing 110. An adjusting knob 117 is provided on the end of the adjusting pin for turning the aforementioned gear (not shown) and consequently moving the rack 115 laterally of the housing 110.

The rack 115 has a generally cylindrical end portion 120, seen best in FIG. 3. The end portion 120 extends into a corresponding cylindrical bore 121 in a mounting bracket 122 into which a lock screw 123 extends. The bracket 122 is bolted to the base plate 39 of the oscillation control assembly 16, as at 124. It will now be seen that the aforementioned angular adjustment of the oscillation control assembly 16 relative to the carriage 18, is readily accomplished by loosening the set screw 123 in the mounting bracket 122, rotating the oscillation control assembly about the axis of the rack 115, and tightening the set screw when the desired angular relationship is reached.

Referring now to FIG. 6, the housing 110 forming a portion of the carriage 18 is shown diagrammatically. The housing 110 is mounted for vertical movement on the track assembly 19. The electrical motor 111 associated with the housing 110 provides the motive force for driving the carriage 18 vertically up and down the track assembly 19. The carriage 18, of course, carries the associated oscillation control assembly 16 and welding torch 15 up and down the plates 13 and 14 in predetermined relationship to the seam 12, as has been previously pointed out.

The track assembly 19 incorporates a pair of vertically extending tracks 130 and 131. The tracks 130 and 131 are each generally H-shaped and are held in fixed relationship relative to each other by any conventional means such as a connecting framework 132. The connecting framework 132 might be provided with a series of vertically displaced pins 133, only one of which is shown, which can be readily inserted and held by a cotter pin arrangement or the like in apertures 134 provided in the plate 14, for example. In this manner, the tracks 130 and 131 are held in a pre-established relationship relative to the seam 12 about to be welded.

The housing 110 rides on the tracks 130 and 131 on wheels 140 mounted on a pair of axles 141. The axles 141 are rotatably mounted in conventional bearings (not shown) within the housing 110. The wheels 140, which might be merely small discs, as is readily seen in FIG. 6, fit into rolling relationship on the rails 130 and 131. The housing 110 is consequently mounted for rolling movement vertically of the track assembly 19 on the individual tracks 130 and 131.

The electrical motor 111 associated with the housing 110 is adapted to move the housing 110 and consequently the carriage 18 up and down on the track assembly 19 at a predetermined speed, as has previously been pointed out. This driving relationship is effected by a rack 150 which is mounted on the track 131 by any conventional means such as bolting or welding, for example, and a gear 151 drivingly connected to the motor 111 through a drive shaft 152. It will now be seen that as the motor 111 turns the drive shaft 152, the gear 151 by virtue of its engagement with the rack 150 travels either upwardly or downwardly on the track 130. This in turn carries the oscillation control assembly 16 and the welding torch 15 upwardly or downwardly with the housing 110.

Power for the electrical motor 111 is provided from the hereinabove described conventional source of electrical power (not shown) through a two-way switch 155 in the control box 31 and an electrical conduit 156. The control box 31 might be mounted on the top of the housing 110 by brackets 157. The switch 155 provides on and off control of the motor 111 while the speed of the motor is adjustable in a well known manner through a conventional speed adjusting knob 158.

To recapitulate the novel features of this invention it should first be made clear that the welding torch 15 feeds an inert gas shielded electrode wire to the weld joint or seam 12 for electric arc welding. The wire is adjustably fed from a motor driven reel (not shown), of any conventional and well known construction. The speed of the wire feed is adjusted to coincide with the speed of the travel of torch 15 along the seam 12, which of course is determined by the travel speed of the carriage 18. It will readily be seen that the speed of the carriage 18 can be arbitrarily adjusted for the "optimum" welding speed desired and the wire feed adjusted simultaneously to coincide with the speed of the carriage.

In the foregoing manner, it is possible to maintain the welding portion or tip 124 of the aluminum electrode 122 at a constant distance from the seam 12. This is necessary because varying the distance results in a fluctuating heat input to the weld bead 17 which causes porosity and lack of fusion. In addition, if the electrode wire 22 and consequently the copper sleeve 25 of the welding torch 15 are located an excessive distance from the seam 12, complete smothering of the weld bead by shielding gas is retarded and might allow atmospheric air to enter the arc, resulting in porosity or other defects in the weld bead. On the contrary, if the electrode wire 22 approaches too closely to the seam 12 and the plates 13 and 14, the arc may flash back to contact the copper tip 25 of the welding nozzle and pollute the weld bead with copper forming a brittle weld alloy.

The "angle of attack" of the welding torch 15 relative to the seam 12 and plates 13 and 14 is also extremely important. In this regard there is an optimum angle at which the arc should be directed to retard blowing out of the molten metal by the arc force. The arc must be maintained at this optimum angle for proper penetration and also proper gas coverage. For example, in vertical welding, with the electrode moving upwardly, a slight upward tipping of the arc allows the inert gases to sweep ahead of the moving electrode and help "clean" the joint area ahead of the electrode.

As a result of this offset tipping, the arc does not impinge directly against the weld bead and the possibility of too violent a penetration of the weld joint by the arc is avoided. In contrast, the angle is readily established at the exact angle desired and required for a particular welding operation and is not inclined too sharply. If the angle is inclined too sharply, the welding torch tends to parallel the face of the work and the arc tends to deposit weld metal in a scatter pattern and cause excessive spatter.

Of similar importance is the oscillation control feature of the invention wherein the electrode arc is automatically oscillated in a desired, controlled rhythmic pattern across the weld seam as the welding torch moves progressively along the seam. The electrode arc must be so oscillated because each portion of the fast freezing aluminum must be contacted by the hot arc at least twice: first, when the weld is deposited and, second, when the arc returns at the end of the oscillating period. This second contact remelts the upper portion of the weld bead and allows the escape of porosity forming gases which would ordinarily be trapped in the fast freezing aluminum. The oscillation rate can be finely controlled to prevent too slow or too fast an oscillation. If the oscillation is too slow, a large and unwieldy mass of molten metal will be deposited. If it is too fast a certain amount of porosity remains in the weld bead and inferior quality welds frequently result.

The controlled, constant amplitude of oscillation of the welding torch is readily established at a predetermined optimum value by the coarse adjustment unit 58 associated with the drive assembly 53 on the oscillation control assembly 16. While a welding operation is in progress, fine adjustment of the amplitude of oscillation to compensate for a widening or narrowing seam, for example, is readily afforded the operator by actuation of the fine adjustment unit 59. Of course, as has been pointed out, an increase in the speed of the motor 50 decreases the period of each oscillation period and consequently increases the speed of travel of the electrode 22 across the seam. Hence, the speed of motor 50 is adjustably set at any predetermined optimum value to obtain the desired welding performance.

Throughout the welding operation, control of the welding torch is readily maintained through the centrally disposed two-way switch 30 in the control box 31 mounted on the housing 110 of the carriage 18. Starting or stopping the conventional electric motor 50 associated with the oscillation control assembly 16 is readily facilitated through the two-way switch 54 also mounted in the control box 31. The speed of the motor 50 is, of course, variable through the speed control mechanism 56. The carriage motor 111 is also provided with on and off control through a two-way switch 155 which is set up in the control box 31, as has been pointed out. The speed of the carriage motor 111 is readily adjustable through its adjustment control knob 158. Each of these controls is readily accessible to the operator during a welding operation. Consequently, it is relatively easy for a single operator to weld a plurality of seams in a storage tank, for example, in a short period of time.

Although a preferred embodiment of this invention has been shown and described, it will be understood that various other embodiments, modifications and improvements might fall within the scope of the invention. Consequently, it is intended that the invention be limited only by the appended claims.

What is desired to be claimed and secured by Letters Patent of the United States is:

1. An apparatus for welding a seam defined by adjoining edge means comprising a welding means, a carriage adapted to move along the seam, an oscillation control assembly, said oscillation control assembly including a base member supported by said carriage, a mounting member mounted on said base member for oscillating movement relative thereto, said welding means being mounted on said mounting member for travel with said control assembly in predetermined relation to the seam, said welding means adapted to build up a weld bead in the seam as it moves longitudinally of the seam, said oscillation control assembly including power means associated with said base member, a drive connection between said power means and said mounting member, said power means adapted to oscillate said mounting member and consequently said welding means, and adjustment means for varying the amplitude and the speed of oscillation of said mounting member and, accordingly, said welding means, relative to the seam as the welding means moves along the seam.

2. An apparatus for welding a seam defined by adjoining edge means comprising a welding means, a carriage adapted to move longitudinally along the seam, an oscillation control assembly, said oscillation control assembly including a base member supported by said carriage, a mounting member pivotally mounted on said base member, said welding means being mounted on said mounting member for travel with said control assembly in predetermined relation to the seam, said welding means adapted to build up a weld bead in the seam as it moves longitudinally of the seam, said oscillation control assembly including power means associated with said base member, a drive connection between said power means and said mounting member, said power means adapted to oscillate said mounting member and consequently said welding means about said pivotal mounting, and adjustment means for varying the amplitude of oscillation of said mounting means, said adjustment means including a coarse adjustment means between said power means and said drive connection for presetting the amplitude of oscillation prior to welding, and a fine adjustment means between said drive connection and said mounting means for varying the amplitude of oscillation during welding.

3. The apparatus of claim 2 further characterized in that said carriage includes laterally adjustable support means, said base member being adjustably connected to said support means for angular movement about the axis of said support means.

4. An assembly for oscillating and controlling the oscillation of a welding device across a seam defined by adjoining edge means as the welding device is moved longitudinally along the seam on a powered carriage while the welding device builds up a weld bead in the seam, said assembly comprising base means adapted to be connected to said carriage for adjustment relative thereto, mounting means adapted to support the welding device, a pivotal means between said base means and said mounting means, power means associated with said base means, a drive connection between said power means and said mounting means, said power means adapted to oscillate said mounting means and consequently said welding means about said pivotal means to assure plural contact of each portion of said weld bead by the welding device and effect a porosity free weld of pleasing appearance and uniform size, and adjustment means for varying the amplitude of oscillation of said support means, said adjustment means including a coarse adjustment unit associated with said drive connection adjacent said power means, said coarse adjustment unit facilitating adjustment of the amplitude of oscillation of said mounting means prior to a welding operation, and a fine adjustment unit associated with said drive connection adjacent said mounting means, said fine adjustment unit facilitating adjustment of the amplitude of oscillation of said support means during a welding operation.

5. The assembly of claim 4 further characterized in that said fine adjustment unit includes means for varying the distance between said pivotal means and a connection joining said drive connection with said mounting means so as to finely adjust the amplitude of oscillation of said support means during a welding operation.

6. An oscillation control assembly for a welding device comprising a base member, a mounting member, a pivotal connection between said members, means on said mounting member for attaching a welding device, power means on said base member for oscillating said mounting member relative to said base member, a drive connection between said power means and said mounting member, adjustment means between said power means and said mounting member for varying the amplitude of oscillation of said mounting means and consequently the welding device relative to said base member, said adjustment means including coarse adjustment means between said drive connection and said power means for varying the amplitude of oscillation of said mounting member and consequently the welding device prior to a welding operation, said adjustment means further including a fine adjustment means joining said drive connection and said mounting member, said fine adjustment means comprising a connector member pivotally mounted on said mounting member for movement relative to said pivotal connection, said drive connection being joined to said connector member, the position of said connector member determining the amplitude of oscillation of said mounting member relative to said base member.

7. An assembly for oscillating a welding device transversely of a seam being welded as the device is moved longitudinally along the seam comprising a mounting member, means on said mounting member for securing the welding device thereto, a base member, a pivotal connection between said members, motive means mounted on said base member and having a rotating power output, a coarse adjustment unit mounted on said power output, and a drive rod connecting said coarse adjustment unit to said mounting member, the connection between said drive rod and said coarse adjustment unit being adjustable relative to the axis of said rotating power output so as to vary the radius of rotation of said connection about said axis and vary the amplitude of oscillation of said mounting member and consequently the welding device relative to the seam being welded, the connection between said drive rod and said mounting member including a fine adjustment unit, said fine adjustment unit adapted to vary the distance between said last mentioned connection and said pivotal connection to vary the amplitude of oscillation of said mounting member and consequently the welding device relative to the seam being welded, during the welding operation.

References Cited in the file of this patent

UNITED STATES PATENTS

| | | |
|---|---|---|
| 1,933,340 | Raymond | Oct. 31, 1933 |
| 1,956,406 | Vars | Apr. 29, 1934 |
| 2,759,083 | Richter et al. | Aug. 14, 1956 |
| 2,817,748 | Meyer | Dec. 24, 1957 |
| 3,035,156 | Staley | May 15, 1962 |